Figure 1:
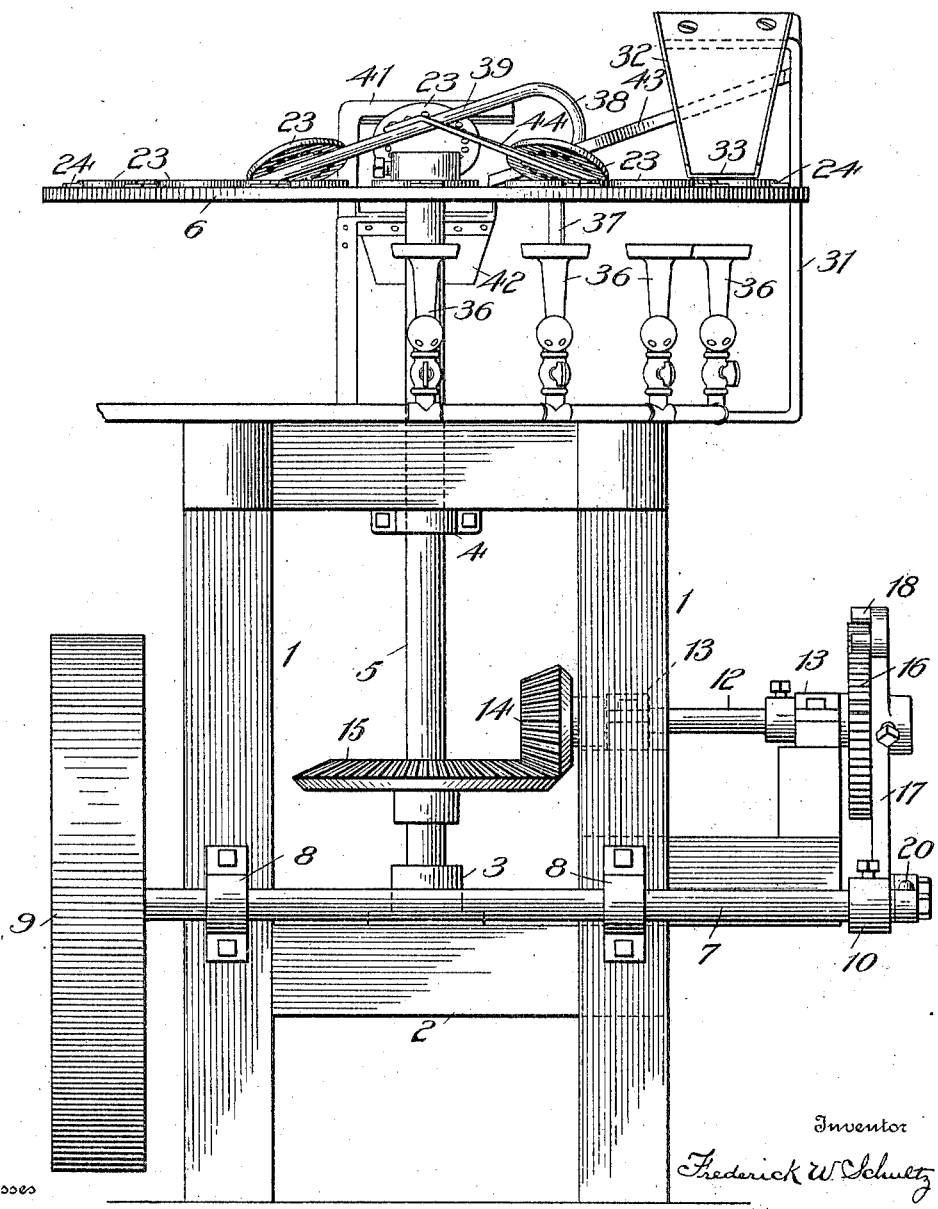

No. 816,942. PATENTED APR. 3, 1906.
F. W. SCHULTZ.
MACHINE FOR SECURING SOLDER RINGS TO METAL CAPS.
APPLICATION FILED MAY 9, 1905.

3 SHEETS—SHEET 1.

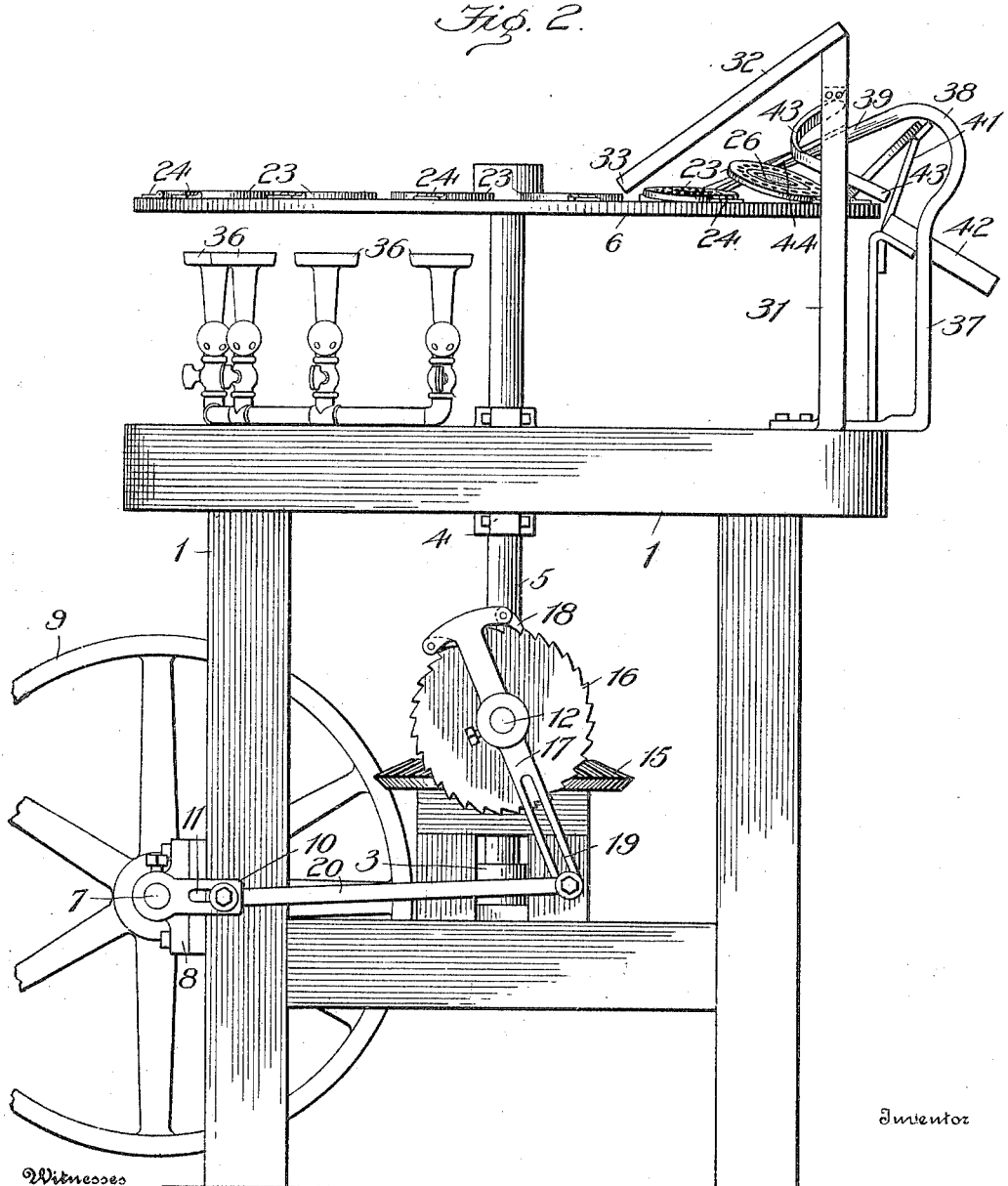

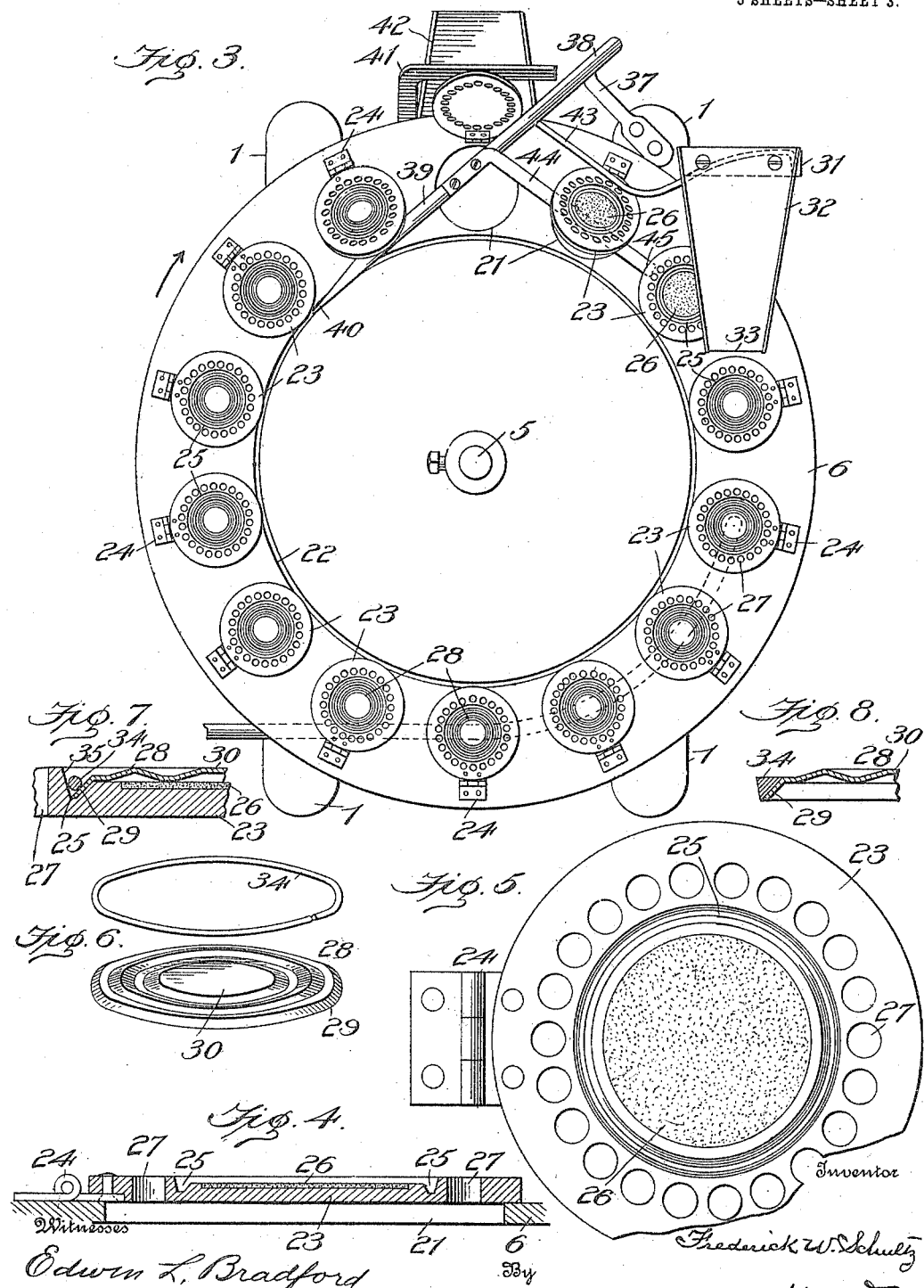

UNITED STATES PATENT OFFICE.

FREDERICK W. SCHULTZ, OF BALTIMORE, MARYLAND.

MACHINE FOR SECURING SOLDER RINGS TO METAL CAPS.

No. 816,942.　　　　Specification of Letters Patent.　　　　Patented April 3, 1906.

Application filed May 9, 1905. Serial No. 259,551.

*To all whom it may concern:*

Be it known that I, FREDERICK W. SCHULTZ, a citizen of the United States, residing at Baltimore, in the State of Maryland, have invented certain new and useful Improvements in Machines for Securing Solder Rings to Metal Caps, of which the following is a specification.

This invention relates to a machine for securing a ready-formed ring of solder upon the top surface and adjacent the rim edge of sheet-metal can-caps for the purpose of facilitating the soldering of the cap upon the can-top.

At the present time it is common to fold or hem a ring of solder around the edge of the metal can-cap; but there are objections to this due to the fact that the solder hem projects beneath the rim edge of the cap and prevents the cap itself from fitting closely in the annular crease of the top of the can, and this ill fitting of the cap permits the same to be accidentally moved slightly from its proper position during the process of fluxing or soldering, which often results in leaks in the solder-joint and the spoiling of the contents of the can unless the leak is discovered and stopped.

I have found that the best results are obtained by first forming a ring of wire solder and then placing the ring on the top surface of the cap and applying enough heat to cause the solder ring to fuse to the cap. In this way the precise quantity of solder required is provided, the size of the ring relative to the size of the cap insures its correct position on the cap, and the solder is already distributed uniformly around the circle of the cap, and it only remains to apply sufficient heat to cause the ring of solder to fuse to the cap.

By my invention of a machine for securing a ready-formed ring of wire solder upon the top surface of the cap adjacent the rim edge the latter is left exposed without solder and no solder reaches the under surface of the cap, which insures that the cap will fit or seat accurately in the annular crease of the can-top.

The invention is illustrated in the accompanying drawings, in which—

Figure 1 illustrates a front elevation of the machine for securing the rings to the caps. Fig. 2 illustrates a side elevation of the same. Fig. 3 illustrates a plan view of the same. Fig. 4 illustrates a sectional detail of a portion of the circular plate or table and one of the hinged disks. Fig. 5 is a detail plan view of one of the disks. Fig. 6 illustrates two views of the cap and soldering-ring. Fig. 7 shows a detail of a portion of the disk with the cap and solder ring seated in the depression, and Fig. 8 illustrates a portion of a cap with the solder attached to the edge thereof.

Referring to the drawings by numerals, 1 designates a frame or table of any suitable construction and having a lower center cross-beam 2 on which a step-bearing 3 is secured. A vertical bearing 4 is also provided above the step-bearing, and a center vertical shaft 5 has its lower end sustained in said step-bearing, while its upper end passes through the vertical bearing 4 to a point above the frame or table. At the upper end the vertical shaft carries a circular plate 6, which is to have a step-by-step revolution in a horizontal plane. A horizontal driving-shaft 7 is mounted in bearings 8 at the front of the frame, and one end of this shaft carries a driving-pulley 9, while the other end of said shaft carries a crank-arm 10, which latter is provided with a slot 11.

A horizontal shaft 12 is sustained in suitable brackets 13, and the inner end of this shaft carries a pinion 14, which meshes with a gear 15, mounted on the lower end of the vertical shaft 5. At the outer end the horizontal shaft 12 carries a ratchet-wheel 16, and the extreme outer end of said shaft, and at the side of said ratchet-wheel, is provided with an oscillating lever 17, the upper end of which carries a pawl 18, which engages the ratchet-wheel 16, while the lower end of said lever is provided with a slot 19. A rod 20 has one end pivotally connected to the lower slotted end of the oscillating lever, while the other end of said rod is pivotally connected to the crank-arm 10. It will thus be seen that as the pulley 9 is revolved the shaft 7 and crank-arm 10 will also revolve, while the rod 20 will impart an oscillating movement to the lever 17 and cause the ratchet-wheel 16 to revolve the shaft 12 and pinion 14 intermittently. Thus the gear 15, vertical shaft 5, and circular plate 6 will be revolved intermittently in a horizontal plane.

The circular plate 6 is provided with a plurality of holes or perforations 21, which have position in a circular path and adjacent the outer or rim edge of the circular plate. These holes are arranged at regular intervals apart and in the present instance there are fourteen of them shown, although the number is immaterial and may be more or less than that shown. Adjacent the holes or perforations the plate 6 is provided with a circular groove or channel 66 for a purpose presently to be described. Each of the holes or perforations in the plate is provided with a disk 23, which latter are secured by hinges 24, so that the disks may be raised or lowered over the holes in the plates. Each of these disks is provided with a central depression, with a circular channel-groove 25 adjacent the edge, and the central portion of said depression is provided with a circular sheet of some suitable material 26 which is a poor conductor of heat—such, for example, as asbestos. Between the depression and the outer rim edge each disk is provided with a plurality of perforations 27, so that the disks may be heated and cooled quickly. The depressions in the disks are of a size to receive a cap 28 of a sheet-metal can, the downturned rim edge 29 of which will fit snugly in the channel-groove 25, while the central arched portion 30 will bridge over the asbestos packing 26, which will protect it from the heat and prevent scorching or discoloring the metal.

A bracket 31 is bolted to the top portion of the frame and extends vertically at the side and slightly toward the rear of the circular plate 6, and the upper end 32 of said bracket extends inwardly over the said plate and sustains a chute 32, the lower end 33 of which terminates at a point adjacent the top surface of the circular plate. The intermittent movements of the plate 6 are regulated so that at each pause one of the perforations or holes 21 will have position directly beneath the lower end 33 of the inclined chute, and during the pause of the plate the operator will place a cap 28, with the wire solder ring 34, in the chute, and said cap will slide down and be discharged into the depression in the disk 23 and the rim edge 29 of the cap will seat snugly in the channel-groove 25, which forms a mold for the solder. The wire-solder ring 34 will remain on the cap during the descent in the chute, and the two together will be deposited in the mold depression in the disk, as seen in Fig. 7 of the drawings. It will be seen by referring to said figure that when the cap and solder ring are in position in the mold depression of the disk the inclined wall 35 of said groove will form a mold to shape the solder on the edge of the cap when the solder is heated, as will now be described. After the cap and solder ring have been deposited on the hinged disk, as above described, the next intermittent movement of the circular plate 6 will cause the disk on which the cap and solder are resting loosely to move over the first of a series of burners 36, where the flame from said first burner will be projected against the bottom surface of the disk, so as to begin heating the latter. As there are a series of these burners 36 arranged at regular intervals apart, the disks will be heated during several intermittent movements of the circular plate, and each burner will play a part in heating the disk and solder, so that the latter will flow and be evenly distributed around the flange of the cap. After the disks have passed beyond the burners the solder on the cap will begin to set and get hard, and it is at this point in the operation that the series of perforations 27 in the disk are useful in allowing the air to circulate and by contact with the increased area of metal cause the disks to rapidly cool sufficiently to permit the caps, with the solder adhering to the edge, to be discharged from the disks. The operation of discharging the soldered disks will next be described. As has heretofore been explained, the disks are each hinged to the circular plate, and the object of thus hinging them is in order that they may be raised and turned backward to dump or discharge the caps.

At the rear of the machine I provide an arm or rod 37, the lower end of which is bolted to the frame and the upper end 38 of which curves forwardly and then extends downwardly in an inclined direction, as at 39, toward the circular plate 6. The end of this arm has a point 40, which projects slightly into the circular groove or channel 22 in the top surface of the plate 6, so as to have a position in a horizontal plane slightly below the surface of the plate. It will be understood that when the disks 23 are lying flat on the plate 6 their inner circular edges will project over the groove or channel 22, and by this means when the disks arrive at the point 40 of the rod the said point will project beneath the free edge of the disks, and when the plate 6 makes its next intermittent movement the free edge of the disk will ride up on the stationary pointed end of the rod, and thereby begin to elevate and assume an inclined position above the holes in the said plate. The next intermittent movement of the plate will cause the disks to be elevated to slightly more than a perpendicular position, with the result that the disk will then fall back against a stop-arm 41, which is also bolted to the frame and which projects above the plate, as clearly seen in Figs. 1 and 3. In falling backward against the stop-arm disks are jarred and the solder-applied caps will fall out into a discharge-chute 42 immediately beneath the stop-arm. Upon the discharge of the caps the disks are momentarily left standing in the rearwardly-inclined position, and it then becomes necessary to return them to the flat horizontal position over the holes, in readiness to receive another cap upon its arrival at the feed-chute. An inclined arm or bar 43 is attached at its upper end to the bracket 31, and from said bracket the bar 43 inclines downwardly toward the discharge-chute 42, and the lower end of said bar terminates beneath the stop-arm 41. As the plate 6 makes another partial or intermittent turn the rearwardly-inclined disk drops from the stop-arm (almost to a rearwardly-horizontal position) and falls on the lower end of said inclined bar 43, and the next partial movement will again elevate the disk by dragging it up the inclined bar 43 until it again falls forward and is caught by a reversely-inclined bar 44. This reversely-inclined bar 44 has its higher end attached to the inclined end 39 of the rod 37, and the lower end 45 of said rod projects forwardly toward the lower end of the feed-chute. After the disk has been thrown forward onto the bar 44 it will be gradually lowered as the plate 6 revolves until it reaches the lower end of the bar, where it will again fall over the hole in the plate in time to receive another cap and solder ring from the feed-chute. This operation takes place with each of the disks, and the operation of elevating, discharging, and returning the disks to normal horizontal position is carried on speedily and positively.

The finished product of this machine is a circular can-cap having a ring of solder secured only on its top surface adjacent the rim edge of the said cap and the said rim edge exposed and free of solder.

Having thus fully described my invention, what I claim as new, and desire to secure by Letters Patent, is—

1. A machine for attaching previously-formed rings of solder to the upper surface of metal caps, comprising a mold to hold the cap and the unattached ring of solder, said mold having means which enable it to be tilted; means for heating the ring of solder after it has been seated on top of the cap, and means for tilting the mold to eject the cap with the solder attached.

2. A machine for attaching previously-formed rings of solder to the upper surface of metal caps, comprising a series of molds each to receive and hold a cap stationary while the unattached ring of solder rests thereon; means for heating the molds sufficiently to cause the rings of solder to fuse to the caps; means for tilting the molds successively one after the other to eject the cap, and means for restoring the molds to their normal position.

3. A machine for attaching previously-formed rings of solder to the upper surface of metal caps, comprising a series of molds to receive the metal caps and unattached rings of solder—said molds being arranged in an endless path and each mold being pivoted so as to permit of being tilted as it advances; means for heating the molds, and means for tilting the pivoted molds to eject the caps.

4. A machine for attaching previously-formed rings of solder to the upper surface of metal caps, comprising a series of molds to receive the caps and unattached rings of solder; means for advancing the molds while the caps and rings of solder are held stationary with respect to said molds; means for heating the molds; means for tilting the molds as they advance to eject the caps, and means for returning the molds to their normal positions after the caps have been ejected.

5. A machine for attaching rings of solder to the edge of metal caps comprising a movable perforated table, a plurality of molds to receive the caps and pivoted to said movable table so as to move independently of the latter, means for heating the molds, means for swinging the molds in a direction at right angles with respect to the table while they and the table are advancing and means for swinging the molds to their normal positions after the caps have been ejected.

6. A machine for applying solder to metal caps having a circular table provided with a plurality of perforations, a mold hinged to said table adjacent each of said perforations, means for revolving the table intermittently to advance the molds, means for moving the molds on their hinges while the table is revolved to eject the caps, and means for returning the molds to their normal positions after the caps are ejected.

7. A machine for applying solder to metal caps having a circular table provided with a plurality of perforations, a mold hinged to said table adjacent each of said perforations, a stationary bar projecting over the table in the path of the molds, means for heating said molds, and means for revolving said table to cause the molds to be upset by the said bar.

8. A machine for applying solder to metal caps having a circular table, a plurality of molds hinged to said table, means for heating the molds, means for revolving said table to advance the molds, means for upsetting the molds to discharge the cap, and stationary arms for righting the molds after the caps are discharged.

9. A machine for applying solder to metal caps having a table, a plurality of molds on said table and each mold having a circular depression with an annular groove in which the flange of the cap fits and which forms a mold to shape the solder on the cap, means for heating the molds and means for revolving the table to upset the molds to eject the caps.

In testimony whereof I affix my signature in presence of two witnesses.

FREDERICK W. SCHULTZ.

Witnesses:
CHARLES B. MANN, Jr.,
G. FERDINAND VOGT.